United States Patent [19]

Fillman

[11] 4,178,956

[45] Dec. 18, 1979

[54] SELF-DRAINING SILL COCK ASSEMBLY

[75] Inventor: Russell L. Fillman, Mitchellville, Iowa

[73] Assignee: Woodford Manufacturing Company, Des Moines, Iowa

[21] Appl. No.: 893,040

[22] Filed: Apr. 3, 1978

[51] Int. Cl.$^2$ ............................................... E03B 9/14
[52] U.S. Cl. .................................... 137/360; 137/302; 137/625.27
[58] Field of Search ............... 137/360, 307, 302, 318, 137/625.27

[56] References Cited
U.S. PATENT DOCUMENTS

| 1,754,310 | 4/1930 | Ellenberger | 138/360 X |
| 3,424,189 | 1/1969 | Woodford | 137/302 X |
| 3,929,150 | 12/1975 | Flinner | 137/218 |

Primary Examiner—Alan Cohan
Attorney, Agent, or Firm—Zarley, McKee, Thomte, Voorhees & Sease

[57] ABSTRACT

A self-draining sill cock assembly is disclosed comprising a fluid outlet for location on an exterior wall, a fluid flow inlet adapted for location adjacent an interior wall and remote from the fluid outlet, a first conduit connecting the fluid inlet and the fluid outlet with the conduit inclined downwardly from the outlet to the inlet, a selectively operable valve located adjacent the fluid flow inlet for alternatively opening and closing the fluid flow inlet, a second conduit operatively connected to said valve adjacent the fluid flow inlet and connected to a drain discharge adapted for location on the exterior wall with the valve alternatively opening and closing the second conduit, the second conduit being inclined downwardly from the valve to the drain discharge, and a manually operated valve control means adapted for location on the exterior wall and extending through the second conduit to the valve. The valve is located adjacent the interior wall while the valve control means is located adjacent the exterior wall with the valve having a first position closing the second conduit and fluidly connecting the first conduit to the fluid flow inlet, a second position closing both the fluid flow inlet and the second conduit, and a third position closing the fluid flow inlet and opening the second conduit for fluid communication with the first conduit whereby fluid in the first conduit would flow down the first conduit, through the valve, down through the second conduit, and out the drain on the exterior side of the wall. An air vent aperture in the valve control means provides venting of the second conduit.

14 Claims, 6 Drawing Figures

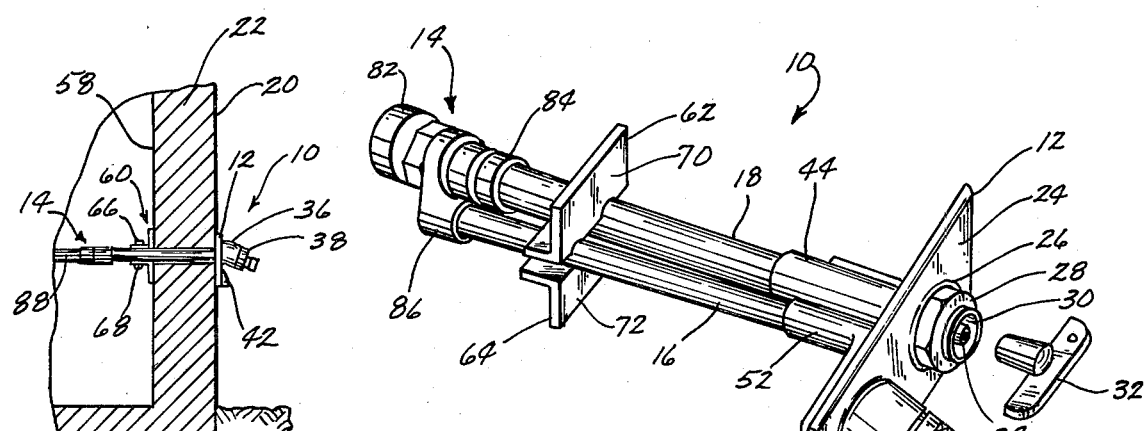
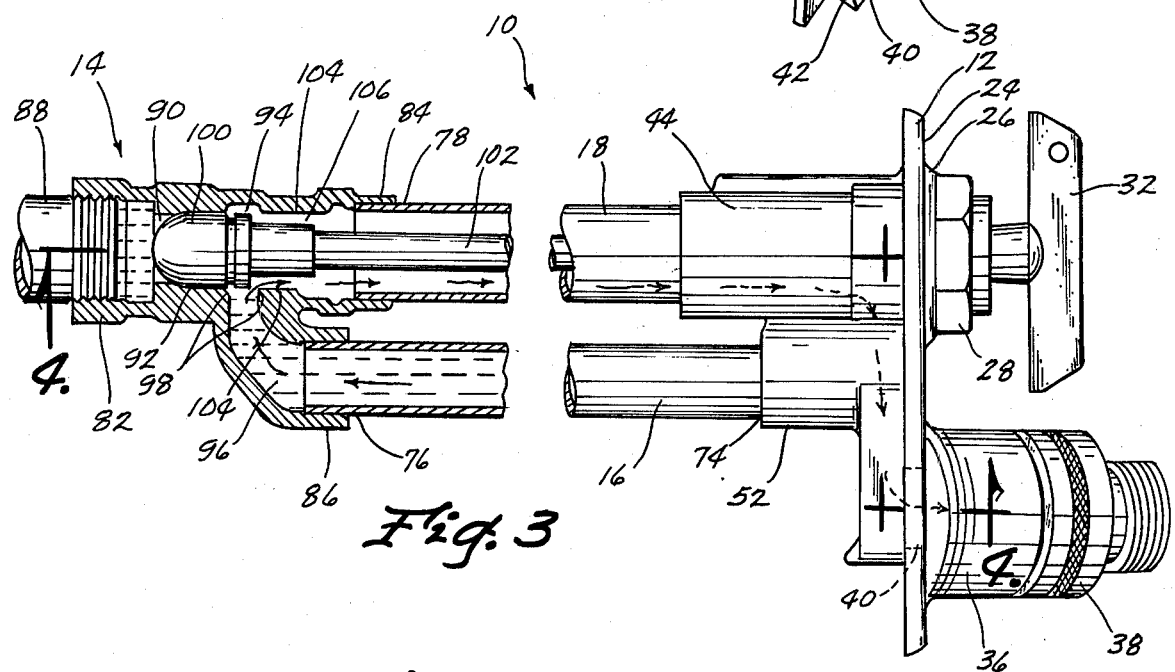
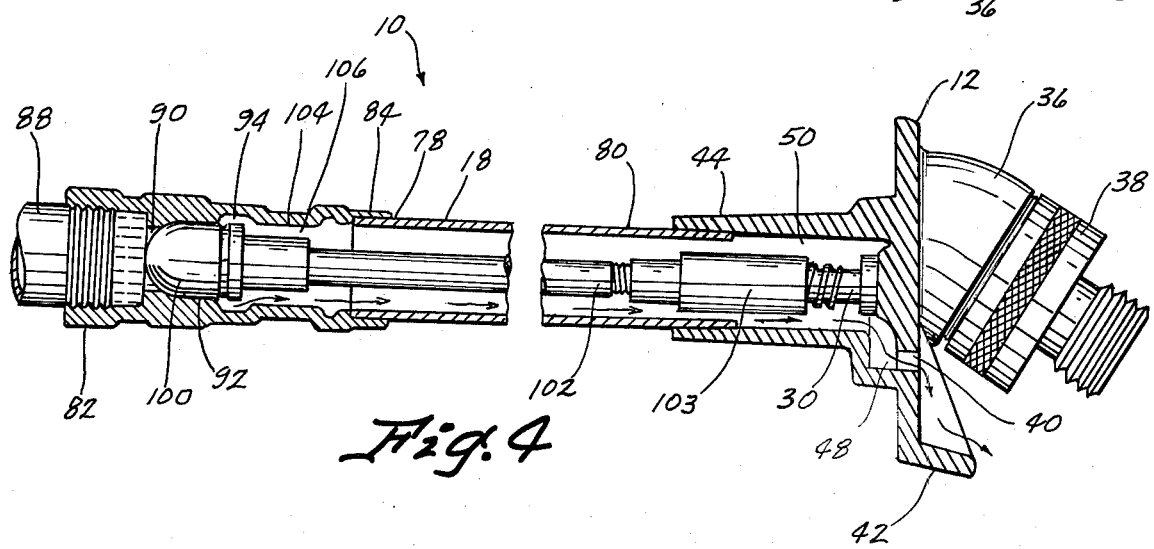

SELF-DRAINING SILL COCK ASSEMBLY

BACKGROUND OF THE INVENTION

This invention relates to wall hydrants or faucet assemblies, and more particularly to a self-draining sill cock intended to extend through an enclosure wall from a fluid inlet connection located on the interior of the wall to an outlet connection located exterior of the wall with the sill cock being self-draining under shut-off conditions to prevent freezing.

This invention is an improvement over prior self-draining sill cocks such as that disclosed in U.S. Pat. No. 3,424,189. The prior devices suffered from leakage problems as the valve control means extended through the pressurized fluid conduit, thereby necessitating packing glands and bushings to prevent leakage around the control elements. Further, these devices required precision assembly in order for the valves to operate in the proper sequence.

SUMMARY OF THE INVENTION

A self-draining sill cock assembly is disclosed comprising a fluid outlet for location on an exterior wall, a first conduit inclined downwardly from the fluid outlet and connecting the fluid outlet to a fluid inlet located adjacent the interior wall, a valve for opening and closing the fluid inlet located adjacent the fluid inlet on the interior wall side with valve control means positioned on the exterior wall, a second conduit being opened and closed to fluid communication with the first conduit by the valve and inclined downwardly from the valve to a drain discharge located on the exterior wall. The incline of the first and second conduits allows water to drain downwardly through the first conduit, through the valve through the second conduit and outwardly from the drain discharge when the fluid inlet is closed by the valve and the second conduit is opened to fluid communication with the first conduit. The manual control portion of the valve extends from the exterior of the wall through a portion of the second conduit to the valve head with an air inlet aperture to assure a vent during draining. By manual operation of the valve control at the exterior wall, three operating positions of the valve located on the interior side of the wall are attained, those being: (1) closing the fluid inlet and opening fluid communication between the first and second conduit; (2) closing the fluid inlet and closing fluid communication between the first and second conduit, and (3) closing fluid communication between the first and second conduit and opening the fluid inlet to fluid communication with the first conduit.

It is a principal object of this invention to provide an improved self-draining sill cock.

A further object of the invention is to provide a self-draining sill cock that efficiently drains residue water in a shut-off condition.

A still further object of the invention is to provide a self-draining sill cock wherein the discharge pipe drains towards the valve and the drain pipe drains towards the outside wall from the valve.

A still further object of the invention is to provide a self-draining sill cock wherein the exterior valve control extends through a portion of the unpressurized drain pipe to the valve located adjacent the interior wall.

A still further object of the invention is to provide a self-draining sill cock that permits more tolerance in the manufacture of the valve with less malfunction of operation.

A still further object of the invention is to provide a self-draining sill cock that allows contemporaneous closing of both the fluid inlet and the drain discharge.

A still further object of the invention is to provide a self-draining sill cock wherein all valving operations are accomplished by one plunger and one valve body at the interior end of the assembly.

A still further object of the invention is to provide a self-draining sill cock that is economical to manufacture, durable in use, and refined in appearance.

BRIEF DESCRIPTION OF THE DRAWINGS

FIG. 1 is a partial sectional side view of the device installed through a wall.

FIG. 2 is a perspective view of the invention.

FIG. 3 is a partially broken away top view of the invention in a "shut-off drain" mode.

FIG. 4 is a partial sectional view seen on line 4—4 of FIG. 3.

DESCRIPTION OF THE PREFERRED EMBODIMENT

Figure 5:
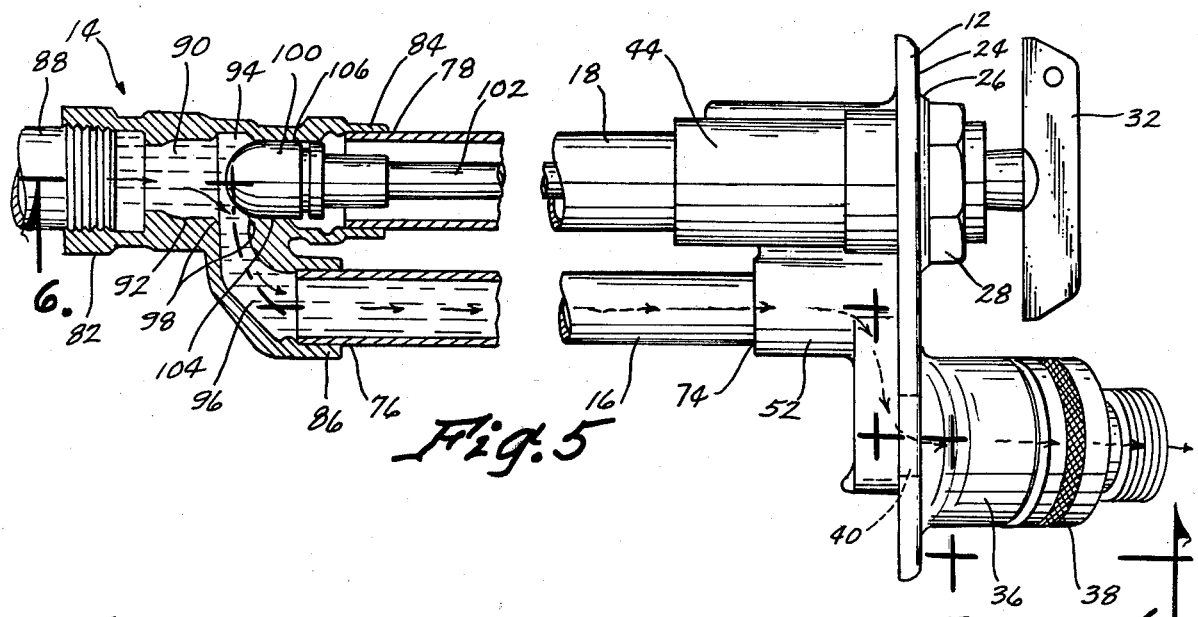
FIG. 5 is a partially broken away top view similar to FIG. 3 in an "open-discharge" mode.

The numeral 10 generally refers to the self-draining sill cock assembly shown in FIG. 2.

Sill cock assembly 10 generally comprises exterior wall housing assembly 12, valve assembly 14, discharge conduit 16, and drain conduit 18.

Housing assembly 12 is mounted on the exterior surface 20 of wall 22 as shown in FIG. 1. Front face 24 has a threaded aperture 26 receiving head nut 28 which in turn rotationally receives stem screw 30 (FIG. 2), the operation of which is described in detail below. Stem screw 30 slidably receives tee key 32 and also contains air vent aperture 34. Hood shaped discharge port 36 protrudes from front surface 24 and is located adjacent aperture 26. Discharge port 36 threadably receives nozzle 38. A vacuum breaker element (not shown) may be located within nozzle 38. Drain port 40 is positioned directly below discharge port 36 with drain shelf 42 directly below port 40 to prevent any dripping on exterior surface 20.

Tube 44 is in alignment with aperture 26 and securely attached to rear surface 46 of housing assembly 12. Preferably tube 44 and housing assembly 12 are of integral construction. Drain conduit 18 is received by tube 44 and permanently secured thereto by soldering or the like. Bore 48 fluidly connects drain port 40 to the interior passageway 50 of tube 44 as shown in FIG. 4. Thus, fluid may flow through drain conduit 18 into passageway 50, througn bore 48 and out drain port 40 as illustrated by the arrows in FIG. 4.

Figure 6:
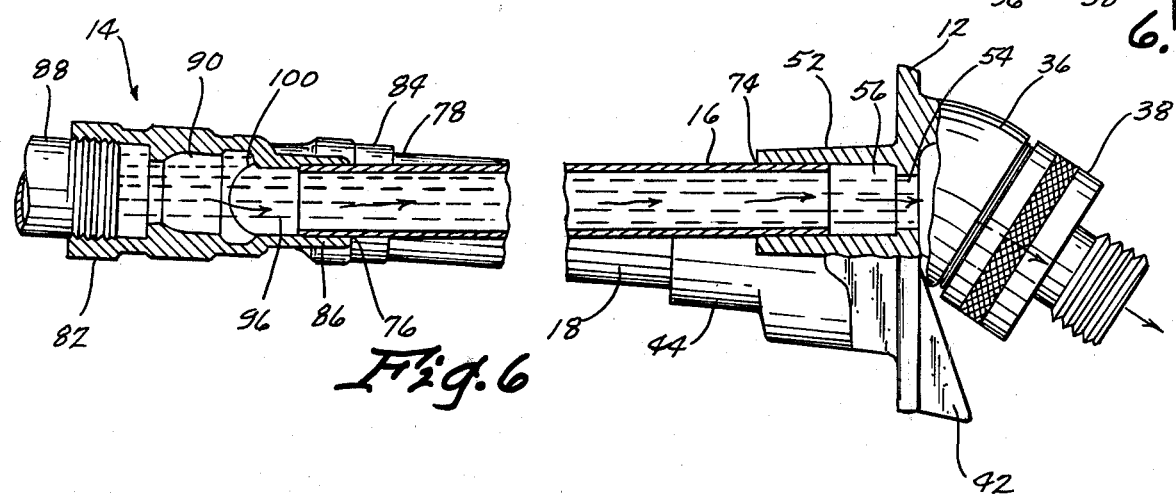
FIG. 6 is a partial sectional view seen on line 6—6 of FIG. 5.

Tube 52 is located adjacent tube 44 and is also preferably of integral construction with housing 12. Bore 54 connects discharge port 36 to the interior passageway 56 of tube 52. Discharge conduit 16 is received by tube 52 and is securely attached thereto by soldering or the like, and thus fluid may flow through discharge conduit 16 into interior passageway 56, through bore 54 and out discharge port 36 and nozzle 38 as illustrated by the arrows in FIG. 6.

Discharge conduit 16 and drain 18 extend transversely from wall housing assembly 12 through wall 22 and outwardly from the interior surface 58 of wall 22, (FIG. 1). Wall clamp assembly 60 comprises top portion 62 and bottom portion 64 joined by bolt 66 and nut 68. Wall clamp 60 is securely clamped to conduits 16 and 18 (FIG. 2) with the flat inward surfaces 70 and 72 of top portion 62 and 64, respectively, engaging interior surface 58 of wall 22 to provide support to conduit 16 and 18 (FIG. 1). The outer end 74 of discharge conduit 16 is vertically higher than the inner end 76 so that water will drain naturally from end 74 to end 76. Conversely, the inner end 78 of drain conduit 18 is vertically higher than the outer end 80 so that water will drain naturally from end 78 and end 80.

Valve assembly 14 comprises water service inlet 82, drain outlet 84, and discharge outlet 86. Water service conduit 88 is threadably received within water service inlet 82. The inner end 78 of drain conduit 18 is received by drain outlet 84 and secured therein by soldering or the like.

Discharge conduit 16 is received by discharge outlet 86 and secured therein by soldering or the like (FIG. 3). Valve bore 90 adjacent valve seat 92 fluidly connects water service inlet 82 to valve chamber 94 (FIG. 5). Valve bore 96 adjacent valve seat 98 fluidly connects discharge outlet 86 to valve chamber 94 (FIG. 3). Valve head 100 attached to operating rod 102 is adapted to move axially within valve chamber 94 to alternatively engage and disengage valve seat 92 to correspondingly close and open the flow of water from water service inlet 82.

Operating rod 102 is attached at one end to valve head 100 and extends longitudinally through drain conduit 18 and is threadably attached at the other end to yoke nut 103. Yoke nut 103 threadably engages stem screw 30 such that rotation of stem screw 30 within yoke nut 103 will produce axial movement of yoke nut 103, operating rod 102, and valve head 100. Therefore, the opening and closing of water surface inlet 82 is accomplished by tee key 32 slidably receiving and rotating stem screw 30 in the desired clockwise or counterclockwise direction. Thus, manual rotation of stem screw 30 on the exterior side of wall 22 controls the valving action of valve assembly 14 located on the interior side of wall 22.

There are three basic operating positions of valve head 100. The "open-discharge" position for providing fluid connection between water service conduit 88 and discharge port 36 which is shown in FIG. 5. Valve head 100 is disengaged from valve seat 92 and valve seat 98 and engages valve seat 104 to allow flow through valve bore 90, chamber 94, and valve bore 96 but prevents flow through valve bore 106. The water therefore flows along the path indicated by the arrows in FIG. 5 being through water service inlet 82, valve bore 90, valve chamber 94, valve bore 96, discharge outlet 86, discharge conduit 16, interior passageway 56, bore 54, discharge port 36, and finally nozzle 38 to provide water service to the exterior of wall 22.

In the "closed-self-draining" position, valve head 100 engages valve seat 92 and disengages valve seat 98 and valve seat 104 as shown in FIG. 3. In this position, water flow from water service conduit 88 is closed off. Since discharge conduit 16 is inclined downwardly toward valve assembly 14, water in conduit 16 will drain into valve bore 96 through chamber 94, and valve bore 106. Since drain conduit 18 is inclined downwardly away from valve assembly 14, the water will continue to flow out of valve bore 106 into conduit 18, through conduit 18, interior passage 50, bore 48 and finally exit through drain port 40 as illustrated by the arrows in FIGS. 3 and 4. Thus, self-draining of the conduits, valve assembly and bores of housing assembly 12 is automatically accomplished.

An intermediate position of valve head 100 between the "open-discharge" position and the "off-self-drain" position, is accomplished whereby valve head 100 engages valve seat 92 and valve seat 98 to close off both water service inlet 82 and valve bore 96, thereby closing off water service and preventing self-draining.

In operation, to provide water service to nozzle 38, tee key 32 is inserted over stem screw 10 and rotated counterclockwise to withdraw valve head 100 from valve seat 92, thereby allowing water flow to conduit 16 as shown in FIG. 5, but preventing water flow through conduit 18. To turn off water service to nozzle 38, tee key 32 is rotated clockwise until valve head 100 engages valve seat 92 to close off water service. Because of the aforementioned relative inclining of conduits 16 and 18, water will then drain from conduit 16 through valve assembly 14, conduit 18, housing 12, and outwardly from drain port 40 as shown by the arrows in FIG. 3. Substantially all the water will be removed in a simple, efficient fashion. Because operating rod 102 and yoke nut 103 connects stem screw 30 to valve head 100 through drain conduit 18, the possibility of leaking problems around this manual valve control mechanism are greatly reduced since conduit 18 is never under water pressure, but functions only as a drain conduit. During the draining process, air vent aperture 34 in stem screw 30 leading to drain conduit 18 aids in the draining operation.

Thus, it can be seen that this invention accomplishes at least all of its stated objectives.

What is claimed is:

1. A self draining sill cock assembly comprising, fluid outlet means adapted for disposition on an exterior wall, fluid flow inlet means spaced remotely from said fluid outlet means and adapted for disposition adjacent an interior wall, first conduit means having first and second ends connecting said fluid flow outlet means and said fluid inlet means in fluid communication, said first end being operationally connected to said outlet means and said second end being operationally connected to said inlet means, selectively operable valve means disposed adjacent said fluid inlet means and remote from said fluid outlet means, said valve means adapted to alternately open and close said inlet means to alternately permit and prevent fluid flow from said inlet means through said first conduit to said outlet means, manually operable valve control means positioned remotely from said first conduit means, having first and second ends, said first end adapted for disposition on an exterior wall in separate and spaced relationship to said outlet means, said second end being operatively connected to said valve means to provide the selective manual operation of said valve means from an exterior wall remote from said valve means, second conduit means having first and second ends operatively connected to said second end to said valve means to provide selective fluid communication between said first conduit means and said second conduit means when said inlet means is closed by said valve means, drain discharge means operationally connected to said first end of said second conduit means, said drain means adapted for disposition on an exterior wall adjacent said fluid outlet means, said first and second conduit means being relatively disposed such that said first end of said first conduit means is vertically higher than said second end of said first conduit means and said first end of said second conduit means is vertically lower than said second end of said second conduit means and said second end of said first conduit means so that fluid will drain from said first conduit means, through said valve means, through said second conduit means and outwardly from said drain discharge means when said fluid inlet means is closed by said valve means and said valve means fluidly connects said first and second conduit means.

2. The device of claim 1 wherein said second end of said first conduit means and said second end of said second conduit means are disposed at substantially the same vertical position.

3. The device of claim 2 wherein said second conduit means has a greater diameter than said first conduit means.

4. The device of claim 1 wherein said second end of said first conduit means is vertically higher than said second end of said second conduit means.

5. The device of claim 1 wherein said valve means is adapted to contemporaneously close said fluid flow inlet means and close fluid communication between said first conduit means and said second conduit means.

6. The device of claim 1 wherein said valve control means extends from said second end being operationally connected to said valve means, through said second conduit means and terminating at said first end on an exterior wall.

7. The device of claim 1 wherein said first end of said valve control means comprises an air inlet aperture to vent said second conduit means during draining.

8. The device of claim 1 wherein said first and second conduit means are longitudinally disposed in a substantially side by side position.

9. A self draining sill cock assembly comprising:

fluid flow outlet means adapted for disposition on an exterior wall;

fluid flow inlet means spaced remotely from said fluid outlet means and adapted for disposition adjacent an interior wall;

drain discharge means adapted for disposition on said exterior wall;

a valve chamber positioned adjacent and in communication with said inlet means;

a first conduit means having an inner end in communication with said valve chamber and an outer end in communication with said outlet means;

a second conduit means having an inner end in communication with said valve chamber and an outer end in communication with said drain discharge means;

valve means within said valve chamber, said valve means being movable from a closed position wherein said inlet means is closed off from said chamber, and said first and second conduit means are in communication with said chamber and hence each other, to an open position wherein said second conduit is closed off from said chamber, and said inlet means and said first conduit means are in communication with said chamber and hence each other;

manually operable valve control means having a first end adapted for disposition on said exterior wall in separate and spaced apart relation to said outlet means, said control means having a second end connected to said valve means for causing selective manual movement of said valve means between said open and closed positions, said valve control means being remote from said first conduit means.

10. A self draining sill cock assembly according to claim 9 wherein said valve control means extends within said second conduit means.

11. A self draining sill cock assembly according to claim 10 wherein said valve means blocks said second conduit means from exposure to pressurized fluid from said inlet means at all times as said valve means moves between said open and said closed positions.

12. A self draining sill cock assembly according to claim 11 comprising a housing front face adapted to be disposed on an exterior wall, said valve control means extending from within said second conduit through said front face to the exterior of said exterior wall.

13. A self draining sill cock assembly according to claim 9 wherein said valve means when moving from said closed to said open positions, closes off said second conduit from communication with said valve chamber before placing said inlet means in communication with said valve chamber.

14. A self draining sill cock assembly according to claim 13 wherein said valve means when moving from said open to said closed positions, closes off said inlet means from said valve chamber before placing said second conduit in communication with said valve chamber.

* * * * *